United States Patent [19]

Harada et al.

[11] 4,389,518

[45] Jun. 21, 1983

[54] PROCESS FOR PRODUCING POLYETHYLENE

[75] Inventors: Masato Harada, Kisarazushi; Atsushi Suzuki, Ichiharashi; Sadahiko Yamada, Ichiharashi; Jun Masuda, Ichiharashi, all of Japan

[73] Assignee: Chisso Corporation, Osaka, Japan

[21] Appl. No.: 296,148

[22] Filed: Aug. 25, 1981

[30] Foreign Application Priority Data

Aug. 29, 1980 [JP] Japan .................................. 55-119387

[51] Int. Cl.$^3$ ......................... C08F 4/02; C08F 10/02
[52] U.S. Cl. ................................. 526/97; 252/429 B; 526/114; 526/115; 526/116; 526/119; 526/121; 526/122; 526/124; 526/125; 526/352
[58] Field of Search ................. 526/97, 114, 115, 116, 526/119, 124, 125, 121, 122

[56] References Cited

U.S. PATENT DOCUMENTS

| | | | |
|---|---|---|---|
| 4,260,723 | 4/1981 | Harada et al. | 526/97 |
| 4,288,578 | 9/1981 | Hsieh | 526/124 |
| 4,331,790 | 5/1982 | Ligorati et al. | 526/125 |

*Primary Examiner*—Edward J. Smith
*Attorney, Agent, or Firm*—Fred Philpitt

[57] ABSTRACT

A process for producing polyethylene having a superior form and a narrower molecular weight distribution with a higher polymer yield is provided. In this process, a combination of a solid product (II) with an organoaluminum compound is used as a polymerization catalyst. This solid product is prepared by first reacting a trivalent metal halide with a divalent metal compound to form a solid product (I), which is then reacted with a halogen-containing transition metal compound and a halogen-free transition metal compound in the presence of a polysiloxane.

2 Claims, No Drawings

PROCESS FOR PRODUCING POLYETHYLENE

BACKGROUND OF THE INVENTION

1. Field of the Invention

This invention relates to a process for producing polyethylene by the use of a novel catalyst having an extremely high polymerization activity.

Ethylene polymerization or polymer referred to herein includes not only ethylene homopolymerization or homopolymer but copolymerization or copolymer of ethylene with another α-olefin copolymerizable therewith. Thus ethylene homopolymer and copolymer will be collectively referred to as polyethylene.

2. Description of the Prior Art

In recent years, techniques for producing polyethylene by the use of Ziegler type catalysts supported on a carrier have prevailed, and this is based mainly on the fact that it has become possible by the use of such catalysts to enhance the efficiency of catalyst utilized, to omit the catalyst removal step and to simplify the production process. Nevertheless, a process for polyethylene production being more enhanced in the efficiency of catalyst utilized and more economical has still been pursued.

As for the carrier for supported Ziegler type catalysts, it is known that anhydrous magnesium chloride or its modified substances, organomagnesium halides such as Grignard reagents, organic magnesium compounds such as magnesium ethoxide or compounds other than magnesium compounds such as alumina, silica silica-alumina have already been employed.

On the other hand, the present inventors have developed processes wherein compounds of complicated compositions formed by reacting a trivalent metal halide such as aluminum chloride with a divalent metal compound such as magnesium oxide, which compounds are intrinsically different from the above prior art carriers, are employed as a carrier whereby it is possible to enhance the catalyst efficiency and also omit the step of catalyst removal. For example, the inventions of Japanese patent application laid-open Nos. Sho 54-116078/1979 and Sho 54-113687/1979 (these inventions will hereinafter be referred to as prior inventions) are characterized by employing a solid product prepared by reacting a compound of transition metals of group 4a or group 4b of the Periodic Table, with the above carrier in the presence of a polysiloxane. Nevertheless, a further improved polymer yield has been desired. On the other hand, the inventions of Japanese patent application laid-open Nos. Sho 55-5931/1980 and Sho 55-12165/1980 are characterized by employing a solid product prepared by further successively reacting the final solid product disclosed in the above Japanese patent application laid-open Nos. Sho 54-116078/1979 and Sho 54-113687/1979, with a halogen-containing compound of transition metals of group 4a or group 5a and a halogen-free compound of transition metals of group 4a or group 5a. However the resulting polymers have a very broad molecular weight distribution. The present inventors have made various studies on the improvement in the prior inventions, and have found that the polymer yield is notably improved by devising the choice and combination of the transition metal compounds and their reaction, and have attained the present invention.

The object of the present invention is to obtain a further improved polymer yield as compared with those according to the prior art in the production of polyethylene having a good form and also a narrow molecular weight distribution.

SUMMARY OF THE INVENTION

The present invention resides in:

In the process for producing polyethylene by the use of a catalyst prepared by reacting a trivalent metal halide with a divalent metal hydroxide, oxide or carbonate, or a composite compound containing the foregoing compounds, or a hydrate of divalent metal compounds to form a solid product (I); further reacting this solid product (I) with a polysiloxane and a compound of transition metals of group 4a or group 5a of the Periodic Table to form a final solid product having the transition metal compound supported thereon; and combining this final solid product with an organoaluminum compound, the improvement which comprises using as the final solid product, a solid product (II) obtained by reacting the solid product (I) with at least two kinds of transition metal compounds consisting of at least one kind selected from group A consisting of halogen-containing compounds of transition metals of group 4a or group 5a (hereinafter referred to as halogen-containing transition metal compound) and at least one kind selected from group B consisting of halogen-free compounds of transition metals of group 4a or group 5a of the Table (hereinafter referred to as halogen-free transition metal compound), in the presence of a polysiloxane.

DESCRIPTION OF PREFERRED EMBODIMENTS

As for the trivalent metal compound, aluminum trichloride (anhydrous) and ferric chloride (anhydrous) are illustrated.

As for the divalent metal compound, there are illustrated hydroxides such as $Mg(OH)_2$, $Ca(OH)_2$, $Zn(OH)_2$, $Mn(OH)_2$, oxides such as $MgO$, $CaO$, $ZnO$, $MnO$, composite oxides containing divalent metal(s) such as $MgAl_2O_4$, $Mg_2SiO_4$, $Mg_6MnO_8$, carbonates such as $MgCO_3$, $MnCO_3$, $CaCO_3$, composite carbonates containing carbonates of divalent metals such as $MgCO_3 \cdot CaCO_3$, halogenated hydrates such as $MgCl_2 \cdot 6H_2O$, $SnCl_2 \cdot 2H_2O$, $MnCl_2 \cdot 4H_2O$, $KMgCl_3 \cdot 6H_2O$, $NiCl_2 \cdot 6H_2O$, hydrates of composite compounds consisting of a halide and a hydroxide of divalent metals such as $3MgO \cdot MgCl_2 \cdot 4H_2O$, hydrates of composite oxides such as $3MgO \cdot 2SiO_2 \cdot 2H_2O$, hydrates of composite compounds consisting of a carbonate and a hydroxide of divalent metals such as $3MgCO_3 \cdot Mg(OH)_2 \cdot 3H_2O$, hydrates of hydroxide and carbonate containing divalent metals such as $Mg_6Al_2(OH)_{16}CO_3 \cdot 4H_2O$, etc.

The solid product (I) is obtained by reacting a trivalent metal halide with a divalent metal compound. For effecting this reaction, it is preferable to carry out, in advance, sufficient mix-milling for 5 to 100 hours in the case of ball mill or for 1 to 10 hours in the case of vibration mill, followed by heating reaction, but it is also possible to carry out heating reaction under mix-milling. As for the mixing proportion of a trivalent metal halide and a divalent metal compound, usually 0.01 to 20 in terms of the atomic ratio of the divalent metal to the trivalent metal may be sufficient, and the ratio is preferably in the range of 0.05 to 10. The reaction temperature is usually in the range of 20° to 500° C., preferably 50° to 300° C. The reaction time is suitably in the range of 30 minutes to 50 hours, and if the reaction temperature is lower, reaction is carried out for a longer time so that no unreacted trivalent metal halide may remain. The resulting solid product is referred to as solid product (I).

The polysiloxanes are chain or cyclic siloxane polymers expressed by the general formula

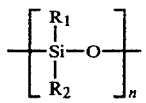

(wherein n represents 3-10,000), and $R_1$ and $R_2$ represent the same or different kinds of substituents capable of being combined to Si, and above all, those consisting of one kind of hydrogen, hydrocarbon residual group such as alkyl group, aryl group, etc., halogen, alkoxy group, aryloxy group, fatty acid residual group, etc., or those in which two kinds or more of the abovementioned radicals or groups are distributed and combined in a molecule in various proportions may be employed.

Examples of polysiloxanes usually employed are chain, lower polymers such as octamethyltrisiloxane $CH_3[Si(CH_3)_2O]_2Si(CH_3)_3$, diphenyloctamethyltetrasiloxane $(CH_3)_3SiO[Si(CH_3)(C_6H_5)O]_2Si(CH_3)_3$, cyclic polymers such as octaethylcyclotetrasiloxane $[Si(C_2H_5)_2O]_4$, hexaphenylcyclotrisiloxane $[Si(C_6H_5)_2O]_3$, chain polymers such as dimethylpolysiloxane $[Si(CH_3)_2O]_n$, methylethylpolysiloxane $[Si(CH_3)(C_2H_5)O]_n$, methylphenylpolysiloxane $[Si(CH_3)(C_6H_5)O]_n$, chain alkylhydrogensiloxane polymers such as methylhydrogenpolysiloxane $[SiH(CH_3)O]_n$, phenylhydrogenpolysiloxane $[SiH(C_6H_5)O]_n$, chain arylhydrogensiloxane polymers and besides, chain polysiloxanes such as chloromethylpolysiloxane $[SiCl(CH_3)O]_n$, methylethoxypolysiloxane $[Si(CH_3)(C_2H_5O)O]_n$, chloromethoxypolysiloxane $[SiCl(CH_3O)O]_n$, methylacetoxypolysiloxane $[Si(CH_3)(CH_3CO_2)O]_n$, etc. Polysiloxanes employed are preferably in the form of liquid, and the viscosity (at 25° C.) are suitably in the range of 10 to 10,000 centistokes, and preferably in the range of 10 to 1,000 centistokes.

As for the halogen-containing transition metal compounds of group A, halides, oxyhalides, alkoxyhalides, acetoxyhalides, etc. of Ti or V can be mentioned, and examples thereof are titanium tetrachloride, titanium tetrabromide, trichloromonoisopropoxytitanium, dichlorodiisopropoxytitanium, monochlorotriisopropoxytitanium, trichloromonobutoxytitanium, dichlorodibutoxytitanium, trichloromonoethoxytitanium, vanadium tetrachloride, vanadium oxytrichloride, etc. Among these, titanium tetrachloride is most preferable.

As for the halogen-free transition metal compounds of group B, the following can be used: alkoxides of Ti or V, such as orthotitanic acid tetraalkyls (tetraalkoxytitaniums), e.g. orthotitanic acid tetraethyl (tetraethoxytitanium), orthotitanic acid tetraisopropyl (tetraisopropoxytitanium), orthotitanic acid tetra-n-butyl (tetra-n-butoxytitanium), etc., vanadyl trialcoholates, e.g. vanadyl triethylate, vanadyl triisopropylate, vanadyl tri-n-butylate, etc. Besides, polytitanic acid esters can be used. These esters can be expressed by the general formula $RO-Ti(OR)_2-O]_mR$ wherein m represents an integer of 2 or more, preferably 2 to 10; Rs represent alkyl group, aryl group or aralkyl group; any of Rs may be not always the same and may be present in admixture; and the number of carbon atoms of R is preferably 1 to 10, but not particularly limited to this range. Concrete examples are polytitanic acid methyl, polytitanic acid ethyl, polytitanic acid isopropyl, polytitanic acid n-butyl, polytitanic acid n-hexyl, etc. A part of the alkoxy group in the above general formula may be replaced by hydroxyl group.

The solid product (II) may be obtained by mixing the solid product (I), a polysiloxane, a transition metal compound of group A and a transition metal compound of group B, and as for the mixing manner, they can be mixed in any order under nitrogen atmosphere, but it is preferable to add the solid product (I) to a mixture of the polysiloxane with the transition metal compounds. The mixing is carried out suitably at $-50°$ C. to $+30°$ C., and preferably at $-20°$ C. to $+20°$ C. At that time, a solvent may be either present or absent.

The mixing proportion of the solid product (I), the polysiloxane, and the transition metal compounds of group A and group B, may be 10 to 10,000 g, preferably 20 to 1,000 g, of polysiloxane and 10 to 10,000 g, preferably 30 to 1,000 g, of the total weight of the transition metal compounds (the sum of the compound of group A and that of group B), based respectively on 100 g of the solid product (I), and 10 to 1,000 g, preferably 30 to 500 g, of the total weight of the transition metal compounds based on 100 g of polysiloxane.

The proportion of the respective amounts of the transition metal compounds of group A and group B used (if two kinds or more are selected from one group and used, the total weight thereof is adopted) may be 0.5 to 30, preferably 1 to 20 in terms of the ratio by weight of group A to group B.

After the mixing, reaction is carried out with stirring at 40° to 300° C., preferably 50° to 200° C., for 10 minutes to 50 hours, preferably 10 minutes to 30 hours.

In the mixing and reaction of the solid product (I), polysiloxane and the transition metal compounds, it is not ways necessary to use a solvent, but since a uniform reaction is desirable, optional or all components of the above may be in advance dissolved or dispersed in a solvent, followed by mixing. As for the total of the amounts of the solvent used, about 10 times or less by weight the total of the respective amounts of the components may be sufficient.

Examples of the solvent used are aliphatic hydrocarbons such as hexane, heptane, octane, decane, aromatic hydrocarbons such as benzene, toluene, xylene, ethylbenzene, cumene, halogenated aromatic hydrocarbons such as chlorobenzene, dichlorobenzene, trichlorobenzene, halogenated hydrocarbons such as carbon tetrachloride, chloroform, dichloroethane, trichloroethylene, tetrachloroethylene, carbon tetrabromide, etc.

After completion of the reaction, the reaction product is separated by filtration in conventional manner and repeatedly washed with a solvent of an aliphatic hydrocarbon or an aromatic hydrocarbon or the like at room temperature or higher, preferably 60° C. or higher till unreacted transition metal compounds and polysiloxane are not detected, followed by drying to obtain a solid product (II).

The catalyst for the production process of the present invention is obtained by combining the solid product (II) with an organoaluminum compound. Examples of the organoaluminum compound are trialkylaluminums such as triethylaluminum, triisobutylaluminum, trihexylaluminum, dialkylaluminum monohalides such as diethylaluminum monochloride, ethylaluminum sesquichloride, and besides, alkoxyalkylaluminums such as monoethoxydiethylaluminum, diethoxymonoethylaluminum, etc.

The catalyst thus obtained is used for the production of polyethylene. Examples of α-olefins used for ethylene copolymerization are straight chain monoolefins such as propylene, butene-1, hexene-1, branched monoolefins such as 4-methyl-pentene-1 and diolefins such as butadiene.

The polymerization reaction is carried out usually in a hydrocarbon solvent such as hexane, heptane, octane, decane, etc. The polymerization temperature is 30° to 150° C., preferably 60° to 120° C. and the polymerization pressure is atmospheric pressure to 50 Kg/cm$^2$, preferably 5 to 40 Kg/cm$^2$. At the time of the polymerization, it is possible to add an adequate amount of hydrogen to the polymerization system to adjust the molecular weight.

The main effectiveness of the present invention consists in an extremely high polymerization yield. The polymerization yield referred to herein means the value of Ep expressed by the equation [Ep=polymer (g)/{solid product (II) (g)×polymerization time (Hr)×ethylene pressure (Kg/cm$^2$)}] (the polymerization yield will hereinafter be often abbreviated to Ep), and the polymerization yield Ep obtained according to the present invention exhibits as high values as 1600~2900 (see Examples 1~8 described later).

In contrast, the Ep values of known processes are far lower. For example, in the case of the process wherein the solid product (I) is subjected to a reaction treatment with a polysiloxane and the resulting product is reacted with a transition metal compound to form a final solid product, the Ep values are only 500 to 600 (see Comparative examples 8 and 15). Further, in the case of the process of the prior inventions wherein the solid product (I), a polysiloxane and transition metal compound(s) are mixed and reacted together to obtain a final solid product, if one or two kinds of halogen-free transition metal compounds are used as the above transition metal compound(s), the Ep values are 650~750 (see Comparative examples 2, 4 and 13), while if one or two kinds of halogen-containing transition metal compounds are used thereas, the values are 650~1650 (see Comparative examples 3, 6, 18, 19, 20 and 21). Furthermore, even when a process wherein a polysiloxane is in advance mixed with a transition metal compound, followed by mixing the solid product (I) is employed, the values are 950~1300 (see Comparative examples 14, 22 and 23). Thus, according to conventional processes or prior inventions, Ep values are very low, whereas according to the improved process of the present invention, the values are notably improved.

Another effectiveness of the present invention is that polymers having a narrower molecular weight distribution are obtained. The polymers have a Mw/Mn value of 5 to 8 and are suitable for injection moldings and a certain kinds of extrusion moldings. Further, the resulting polymers have a very good form and the bulk density amounts of 0.47. Thus, the production efficiency per volume of polymerization vessel per hour is high; adhesion of polymer onto the wall of polymerization vessel at the time of polymerization does not occur at all or its amount is extremely small; and a long-term stabilized continuous polymerization by the use of the same polymerization vessel is possible.

In the following Examples and Comparative examples, MI means melt index; Mw/Mn means an index of molecular weight distribution (wherein Mw means weight average molecular weight and Mn means number average molecular weight); and BD means a bulk density of polymer powder.

EXAMPLE 1

(1) Preparation of solid product (I)

Magnesium hydroxide (58 g) and aluminum trichloride (anhydrous) (90 g) were in advance mixed and milled in a vibration mill for 5 hours, followed by reaction at 150° C. for 5 hours. The resulting reaction product was cooled and finely milled to obtain a solid product (I).

(2) Preparation of solid product (II)

A chain dimethylpolysiloxane (viscosity: 100 centistokes) (100 g), TiCl$_4$ (100 g) and orthotitanic acid tetra-n-butyl (30 g) were added to toluene (200 ml) and mixed together, while the temperature was kept at 20° C. and agitation was carried out and further the above solid product (I) (100 g) was added, followed by reaction at 80° C. for 3 hours. After completion of the reaction, filtration was first carried out and the remaining solid product was washed with hexane till unreacted titanium compound and unreacted polysiloxane were not detected in the filtrate, followed by drying under reduced pressure to obtain a solid product (II) as a final solid product. The content of Ti atom in 1 g of the solid product (II) was 52 mg.

All operations till the solid product (II) was prepared were carried out under nitrogen gas atmosphere containing no moisture. This applies to the succeeding Examples and Comparative examples.

(3) Production of polyethylene

Into a 20 l capacity stainless steel polymerization vessel purged with nitrogen gas were introduced hexane (10 l), triethylaluminum (230 mg) and the above solid product (II) (50 mg). The polymerization vessel was closed and the temperature was raised up to 80° C. Hydrogen was introduced up to 4 Kg/cm$^2$G, and while ethylene was continuously introduced so as to maintain the total pressure at 15 Kg/cm$^2$G, polymerization was carried out at 80° C. for 2 hours. After completion of the reaction, the resulting polyethylene was filtered off without deashing, followed by drying to obtain a white polymer (2880 g), which had a MI of 8.5, a BD of 0.47, a Mw/Mn of 8 and an Ep (polymer yield) of 2,800. The results are shown in Table 1.

COMPARATIVE EXAMPLE 1

A final solid product was prepared as in Example 1 except that in (2) of Example 1, no chain dimethylpolysiloxane was used.

Using this final solid product in place of the solid product (II), polyethylene production was carried out as in (3) of Example 1. The yield and physical properties of the resulting polymer are shown in Table 1.

COMPARATIVE EXAMPLE 2

A final solid product was prepared as in Example 1 except that no TiCl$_4$ was used in (2) of Example 1.

Using this final solid product, the succeeding procedure was carried out as in Comparative example 1.

COMPARATIVE EXAMPLE 3

A final solid product was prepared as in Example 1 except that no orthotitanic acid tetra-n-butyl was used in (2) of Example 1.

Using this final solid product, the succeeding procedure was carried out as in Comparative example 1.

COMPARATIVE EXAMPLE 4

A final solid product was prepared as in Example 1 except that polytitanic acid ethyl (100 g) was used in place of $TiCl_4$ in (2) of Example 1.

Using this final solid product, the succeeding procedure was carried out as in Comparative example 1.

COMPARATIVE EXAMPLE 5

A final solid product was prepared as in Example 1 except that $SiCl_4$ (100 g) was used in place of $TiCl_4$ in (2) of Example 1.

Using this final solid product, the succeeding procedure was carried out as in Comparative example 1.

COMPARATIVE EXAMPLE 6

A final solid product was prepared as in Example 1 except that trichloromono-n-butyl-titanium (30 g) was used in place of orthotitanic acid tetra-n-butyl in (2) of Example 1.

Using this final solid product, the succeeding procedure was carried out as in Comparative example 1.

COMPARATIVE EXAMPLE 7

A final solid product was prepared as in Example 1 except that aluminum tri-n-butoxide (30 g) was used in place of orthotitanic acid tetra-n-butyl in (2) of Example 1.

Using this final solid product, the succeeding procedure was carried out as in Comparative example 1.

COMPARATIVE EXAMPLE 8

A solid product (I) (100 g) obtained in the same manner as in (1) of Example 1 was reacted with the same chain dimethylpolysiloxane (100 g) as in Example 1 in toluene (200 ml) at 120° C. for 2 hours. The supernatant liquid was removed. The reaction product was repeatedly washed 4 times with hexane in 200 ml each time and successively reacted with a mixture of $TiCl_4$ (100 g) with orthotitanic acid tetra-n-butyl (30 g) at 110° C. for one hour, followed by washing with hexane and drying under reduced pressure to obtain a final solid product.

Using this final solid product, the succeeding procedure was carried out as in Comparative example 1.

COMPARATIVE EXAMPLE 9

A final solid product was prepared as in Comparative example 8 except that after the reaction of the solid product (I) with the chain dimethylpolysiloxane in toluene, $TiCl_4$ (100 g) and orthotitanic acid tetra-n-butyl (30 g) were successively added without removing unreacted dimethylpolysiloxane (i.e. without carrying out washing operation).

Using this final solid product, the succeeding procedure was carried out as in Comparative example 1.

COMPARATIVE EXAMPLE 10

$TiCl_4$ (100 g) was mixed with orthotitanic acid tetra-n-butyl (30 g) in toluene (200 ml), and reaction was then carried out at 80° C. for 3 hours, followed by cooling and adding hexane (500 ml) to precipitate a solid product which was filtered off and dried to obtain a solid product.

Polyethylene production was carried out as in (3) of Example 1 except that the above solid product was used in place of the solid product (II). The results are shown in Table 1.

COMPARATIVE EXAMPLE 11

Polyethylene production was carried out as in (3) of Example 1 except that the solid product (I) (40 mg) obtained in Example 1 and the solid product (10 mg) obtained in Comparative example 10 were used in place of the solid product (II). The results are shown in Table 1.

EXAMPLE 2

(1) Magnesium oxide (40 g) and aluminum trichloride (anhydrous) (85 g) were mixed and milled in a ball mill for 24 hours, followed by reaction at 200° C. for one hour to obtain a solid product (I).

(2) A chain methylhydrogenpolysiloxane (viscosity: 50 centistokes) (50 g), $TiCl_4$ (100 g), orthotitanic acid tetraethyl (10 g) and the above solid product (I) (100 g) were at the same time added to xylene (300 ml) and mixed together, while the temperature was kept at 20° C. and agitation was carried out, followed by reaction at 110° C. for 2 hours to obtain a solid product (II) as a final solid product.

(3) Polyethylene production was carried out as in (3) of Example 1 except that the above solid product (II) was used. The results are shown in Table 1.

COMPARATIVE EXAMPLE 12

A final solid product was prepared as in Example 2 except that no chain methylhydrogenpolysiloxane was used in (2) of Example 2.

Using this final solid product in place of the solid product (II) in (3) of Example 2, polyethylene production was carried out as in (3) of Example 2. The results are shown in Table 1.

COMPARATIVE EXAMPLE 13

A final solid product was prepared as in Example 2 except that no $TiCl_4$ was used.

Using this final solid product, the succeeding procedure was carried out as in Comparative example 12.

COMPARATIVE EXAMPLE 14

A final solid product was prepared as in Example 2 except that no orthotitanic acid tetraethyl was used.

Using this final solid product, the succeeding procedure was carried out as in Comparative example 12.

COMPARATIVE EXAMPLE 15

A solid product (I) (100 g) obtained as in Example 2 was reacted with the same chain methylhydrogenpolysiloxane (50 g) as in Example 2 in xylene (300 ml) at 120° C. for 2 hours, followed by removing the supernatant liquid and repeating washings 4 times with hexane in 200 ml each time. Successively the reaction product was further reacted with a mixture of $TiCl_4$ (100 g) with orthotitanic acid tetraethyl (10 g), at 110° C. for one hour to obtain a final solid product.

Using this final solid product, the succeeding procedure was carried out as in Comparative example 12.

COMPARATIVE EXAMPLE 16

A final solid product was prepared as in Comparative example 15 except that neither removal of the supernatant liquid nor washings were carried out.

Using this final solid product, the succeeding procedure was carried out as in Comparative example 12.

EXAMPLE 3

(1) A solid product (I) was prepared as in (1) of Example 1 except that ferric chloride (anhydrous) (110 g) was used in place of aluminum trichloride.

(2) A solid product (II) was prepared as in (2) of Example 1 except that the above solid product (I) was used; octaethylcyclotetrasiloxane (viscosity: 10 centistokes) (100 g) was used in place of dimethylpolysiloxane; trichloromonoisopropoxytitanium (100 g) was used in place of $TiCl_4$; and polytitanic acid isopropyl (pentamer) (30 g) was used in place of orthotitanic acid tetra-n-butyl.

(3) Using this solid product (II), polyethylene production was carried out as in (3) of Example 1. The results are shown in Table 1.

COMPARATIVE EXAMPLE 17

A final solid product was prepared as in (2) of Example 3 except that no trichloromonoisopropoxytitanium was used.

Using this final solid product in place of the solid product (II), polyethylene production was carried out as in (3) of Example 3. The results are shown in Table 1.

COMPARATIVE EXAMPLE 18

A final solid product was prepared as in Example 3 except that no polytitanic acid isopropyl was used.

Using this final solid product, the succeeding procedure was carried out as in Comparative example 17.

EXAMPLE 4

(1) Manganese carbonate (110 g) and aluminum trichloride (anhydrous) (100 g) were in advance mixed and milled together in a ball mill for 48 hours, followed by reaction at 130° C. for 4 hours to obtain a solid product (I).

(2) A chain methylethylpolysiloxane (viscosity: 500 centistokes) (200 g), $VCl_4$ (130 g) and orthotitanic acid tetraisopropyl (25 g) were added to toluene (150 ml) and mixed together while the temperature was kept at 0° C. and agitation was carried out. The above solid product (I) (100 g) was then added, followed by reaction at 130° C. for 2 hours to obtain a solid product (II).

(3) Using this solid product (II), polyethylene production was carried out as in (3) of Example 1. The results are shown in Table 1.

EXAMPLE 5

(1) A solid product (I) was prepared as in (1) of Example 1 except that magnesium chloride (hexahydrate) (75 g) was used in place of magnesium hydroxide.

(2) A solid product (II) was prepared as in (2) of Example 1 except that the above solid product (I) was used.

(3) Using this solid product (II), polyethylene production was carried out as in (3) of Example 1. The results are shown in Table 1.

COMPARATIVE EXAMPLE 19

A final solid product was prepared as in Example 4 except that no orthotitanic acid tetraisopropyl was used.

Using this final solid product in place of the solid product (II), polyethylene production was carried out as in (3) of Example 4. The results are shown in Table 1.

COMPARATIVE EXAMPLE 20

A final solid product was prepared as in Example 5 except that no orthotitanic acid tetra-n-butyl was used.

Using this final solid product in place of the solid product (II), polyethylene production was carried out as in (3) of Example 5. The results are shown in Table 1.

EXAMPLE 6

(1) Hydromagnesite ($3MgCO_3.Mg(OH)_2.3H_2O$) (65 g) and ferric chloride (anhydrous) (70 g) were mixed and milled together in a vibration mill while they were reacted on heating at 300° C. for one hour to obtain a solid product (I).

(2) A chain methylhydrogenpolysiloxane (70 g), $TiCl_4$ (100 g) and polytitanic acid n-butyl (trimer) (10 g) were added to toluene (400 ml) and mixed together while the temperature was kept at −10° C. and agitation was carried out. Successively the above solid product (I) (100 g) was added, followed by reaction at 100° C. for 2 hours to obtain a solid product (II).

(3) Polyethylene production was carried out as in (3) of Example 1 except that the above solid product (II) (50 mg) and triisobutylaluminum (400 mg) were used. The results are shown in Table 1.

COMPARATIVE EXAMPLE 21

A final solid product was prepared as in (2) of Example 6 except that no polytitanic acid n-butyl was used.

Using this final solid product in place of the solid product (II), polyethylene production was carried out as in (3) of Example 6.

EXAMPLE 7

(1) Magnesia cement ($3MgO.MgCl_2.4H_2O$) (110 g) and aluminum trichloride (anhydrous) (100 g) were reacted together on heating at 100° C. for 24 hours in a ball mill to obtain a solid product (I).

(2) A chain dimethylpolysiloxane (200 g), $TiCl_4$ (100 g), polytitanic acid ethyl (decamer) (15 g) and the above solid product (I) (100 g) were at the same time added to toluene (200 ml) and mixed together while the temperature was kept at 0° C. and agitation was carried out, followed by reaction at 80° C. for 2 hours to obtain a solid product (II).

(3) Polyethylene production was carried out as in (3) of Example 1 except that the above solid product (II) was used. The results are shown in Table 1.

COMPARATIVE EXAMPLE 22

A final solid product was prepared as in (2) of Example 7 except that no polytitanic acid ethyl was used.

Polyethylene production was carried out as in (3) of Example 7 except that the above final solid product was used in place of the solid product (II). The results are shown in Table 1.

EXAMPLE 8

(1) Hydrotalcite ($Mg_6Al_2(OH)_{16}CO_3.4H_2O$) (70 g) and aluminum trichloride (anhydrous) (95 g) were mixed and milled together in a ball mill for 48 hours, followed by reaction at 120° C. for 4 hours to obtain a solid product (I).

(2) A chain dimethylpolysiloxane (300 g), TiCl₄ (200 g), vanadyl tributylate (20 g) and the above solid product (I) (100 g) were at the same time added to xylene (300 ml) and mixed together while the temperature was kept at 20° C. and agitation was carried out, followed by reaction at 150° C. for 2 hours to obtain a solid product (II).

(3) Polyethylene production was carried out as in (3) of Example 1 except that the above solid product (II) was used. The results are shown in Table 1.

COMPARATIVE EXAMPLE 23

A final solid product was prepared as in (2) of Example 8 except that no vanadyl tributylate was used.

Polyethylene production was carried out as in (3) of Example 8 except that the above final solid product was used in place of the solid product (II). The results are shown in Table 1.

EXAMPLE 9

An ethylene-propylene copolymerization was carried out using the solid product (II) obtained in Example 1.

Namely an ethylene-propylene copolymer was produced as in Example 1 except that in (3) of Example 1, the hydrogen pressure was made 3 Kg/cm²G and ethylene containing 8% by volume of propylene was introduced. The results are shown in Table 2.

EXAMPLE 10

An ethylene-butene-1 copolymerization was carried out using the solid product (II) obtained in Example 1.

Namely an ethylene-butene copolymer was produced as in Example 1 except that in (3) of Example 1, the hydrogen pressure was made 3.5 Kg/cm²G and ethylene containing 10% by volume of butene-1 was introduced. The results are shown in Table 2.

TABLE 2

| Example | Transition metal atom in 1 g of solid product (II) (mg) | Polymer Yield Ep | Polymer Yield per g of transition metal atom | Physical properties of polymer MI | Physical properties of polymer BD | Physical properties of polymer $\overline{Mw}/\overline{Mn}$ | Comonomer content (wt. %) |
|---|---|---|---|---|---|---|---|
| 9 | 52 | 2,860 | $1.1 \times 10^6$ | 9.8 | 0.46 | 8 | 5.6 |
| 10 | 52 | 2,830 | $1.1 \times 10^6$ | 9.3 | 0.44 | 8 | 4.7 |

TABLE 1

| Example or Compar. ex. | Transition metal atom in 1 g of final solid product (mg) | Polymer Yield Ep | Polymer Yield per g of transition metal atom (g) | Physical properties of polymer MI | Physical properties of polymer BD | Physical properties of polymer $\overline{Mw}/\overline{Mn}$ |
|---|---|---|---|---|---|---|
| Ex. 1 | 52* | 2,800 | $1.1 \times 10^6$ | 8.5 | 0.47 | 8 |
| Comp. ex. 1 | 27 | 240 | $1.8 \times 10^5$ | 0.15 | 0.28 | 16 |
| Comp. ex. 2 | 8 | 710 | $1.8 \times 10^6$ | 1.5 | 0.36 | 6 |
| Comp. ex. 3 | 10 | 1,250 | $2.6 \times 10^6$ | 6.4 | 0.46 | 6 |
| Comp. ex. 4 | 8 | 700 | $1.8 \times 10^6$ | 1.3 | 0.35 | 7 |
| Comp. ex. 5 | 9 | 210 | $4.8 \times 10^5$ | 0.16 | 0.28 | 5 |
| Comp. ex. 6 | 15 | 1,320 | $1.8 \times 10^6$ | 5.9 | 0.45 | 6 |
| Comp. ex. 7 | 12 | 980 | $1.7 \times 10^6$ | 4.0 | 0.34 | 8 |
| Comp. ex. 8 | 9 | 510 | $1.2 \times 10^6$ | 3.5 | 0.38 | 6 |
| Comp. ex. 9 | 10 | 520 | $1.1 \times 10^6$ | 3.8 | 0.36 | 6 |
| Comp. ex. 10 | 170 | 100 | $1.2 \times 10^4$ | 0.01 | 0.20 | 14 |
| Comp. ex. 11 | — | 30 | — | 0.01 | 0.17 | 14 |
| Ex. 2 | 45* | 2,750 | $1.3 \times 10^6$ | 10.1 | 0.46 | 7 |
| Comp. ex. 12 | 21 | 260 | $2.6 \times 10^5$ | 0.17 | 0.28 | 14 |
| Comp. ex. 13 | 9 | 660 | $1.5 \times 10^6$ | 1.9 | 0.35 | 7 |
| Comp. ex. 14 | 12 | 1,300 | $2.2 \times 10^6$ | 6.0 | 0.45 | 6 |
| Comp. ex. 15 | 10 | 560 | $1.2 \times 10^6$ | 4.1 | 0.36 | 6 |
| Comp. ex. 16 | 17 | 580 | $7.0 \times 10^5$ | 3.8 | 0.36 | 6 |
| Ex. 3 | 32* | 2,200 | $1.4 \times 10^6$ | 7.2 | 0.43 | 7 |
| Comp. ex. 17 | 7 | 530 | $1.5 \times 10^6$ | 0.53 | 0.35 | 7 |
| Comp. ex. 18 | 9 | 1,050 | $2.4 \times 10^6$ | 4.8 | 0.43 | 6 |
| Ex. 4 | 26* | 1,750 | $1.4 \times 10^6$ | 6.5 | 0.40 | 6 |
| Comp. ex. 19 | 6 | 790 | $2.7 \times 10^6$ | 5.4 | 0.38 | 5 |
| Ex. 5 | 38* | 2,430 | $1.3 \times 10^6$ | 8.1 | 0.46 | 7 |
| Comp. ex. 20 | 9 | 1,280 | $2.9 \times 10^6$ | 6.8 | 0.45 | 6 |
| Ex. 6 | 25* | 1,660 | $1.4 \times 10^6$ | 6.2 | 0.44 | 6 |
| Comp. ex. 21 | 10 | 650 | $1.4 \times 10^6$ | 4.4 | 0.44 | 5 |
| Ex. 7 | 35* | 2,500 | $1.5 \times 10^6$ | 7.5 | 0.45 | 7 |
| Comp. ex. 22 | 11 | 1,300 | $2.4 \times 10^6$ | 4.3 | 0.45 | 6 |
| Ex. 8 | 30* | 1,890 | $1.3 \times 10^6$ | 5.8 | 0.42 | 5 |
| Comp. ex. 23 | 9 | 950 | $2.2 \times 10^6$ | 3.7 | 0.45 | 5 |

*Solid product (II)

COMPARATIVE EXAMPLE 24

TiCl₄ (100 g) and orthotitanic acid tetra-n-butylate (30 g) were added to toluene (200 ml) kept at 10° C. and mixed together. To the mixture was added a solid product (100 g) obtained as in the case of the final solid product in Comparative example 3, followed by reaction at 80° C. for 3 hours. After completion of the reaction, filtration was first carried out and the remaining solid product was washed with hexane till unreacted titanium compound and unreacted polysiloxane were not detected in the filtrate, followed by drying under reduced pressure to obtain a final solid product.

Polyethylene production was carried out as in (3) of Example 1 except that the above final solid product was used in place of the solid product (II). The results are shown in Table 3.

COMPARATIVE EXAMPLE 25

A solid product (100 g) obtained as in the case of the final solid product in Comparative example 21, TiCl₄ (100 g) and polytitanic acid n-butyl (trimer, the same material as in Example 6) (10 g) were at the same time added to toluene (400 ml) maintained at −10° C., and mixed together, followed by reaction at 100° C. for 2 hours to obtain a final solid product.

Polyethylene production was carried out as in (3) of Example 6 except that the above final solid product was used in place of the solid product (II). The results are shown in Table 3.

TABLE 3

| Comp. ex. | Transition metal atom in 1 g of final solid product (mg) | Polymer Yield Ep | Polymer Yield per g of Transition metal atom | Physical properties of polymer MI | Physical properties of polymer BD | Physical properties of polymer $\overline{Mw}/\overline{Mn}$ |
|---|---|---|---|---|---|---|
| 24 | 34 | 1,020 | $6.0 \times 10^5$ | 0.17 | 0.42 | 18 |
| 25 | 16 | 610 | $8.1 \times 10^5$ | 0.24 | 0.39 | 14 |

What is claimed is:

1. A process for producing polyethylene by ethylene polymerization in the presence of a catalyst obtained by combining a solid product (II), obtained by the following steps (a) and (b), with an organoaluminum compound:
   (a) obtaining a solid product (I) by reacting
      (i) a trivalent metal halide selected from the group consisting of anhydrous aluminum chloride and anhydrous ferric chloride, with
      (ii) a divalent metal hydroxide, oxide, carbonate or a composite compound containing a divalent metal hydroxide, oxide or carbonate or a hydrate of a divalent metal compound,
      the ratio by weight of said (i) to said (ii) being in the range of 1 to 20; and
   (b) reacting in the presence of a polysiloxane, said solid product (I) with at least two kinds of transition metal compounds consisting of
      (1) at least one halogen-containing transition metal compound selected from the group (A) consisting of the halides, oxyhalides, alkoxyhalides and acetoxyhalides of titanium or vanadium, and
      (2) at least one halogen-free transition metal compound selected from the group (B) consisting of tetraalkyl orthotitanates, vanadyl trialcoholoates and polytitanic acid esters expressed by the general formula RO—Ti(OR)$_2$—O]$_m$R wherein m is an integer of 2 or more and the Rs are the same or different kinds of alkyl groups, aryl groups or aralkyl groups.

2. A process according to claim 1 wherein the mixing proportion of the solid product (I), the polysiloxane, and the transition metal compounds of group A and group B, is 10 to 10,000 g of polysiloxane and 10 to 10,000 g, of the total weight of the transition metal compounds (the sum of the compound of Group A and that of Group B), based respectively on 100 g of the solid product (I), and 10 to 1,000 g of the total weight of the transition metal compounds based on 100 g of polysiloxane.

* * * * *